J. J. WALSH.
TICKET HOLDER.
APPLICATION FILED JULY 14, 1908.
909,972.
Patented Jan. 19, 1909.
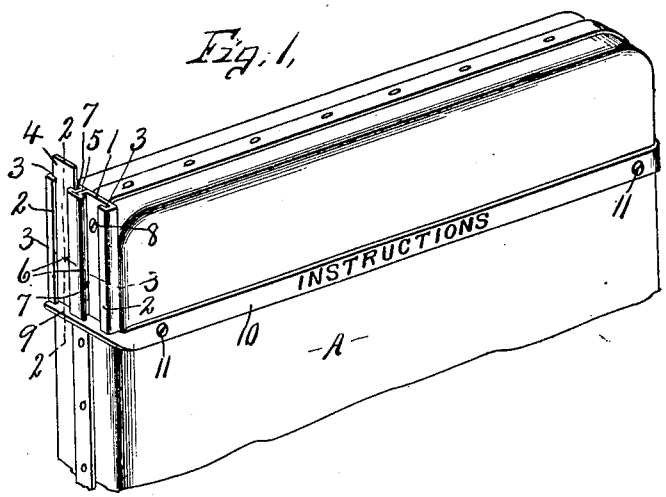
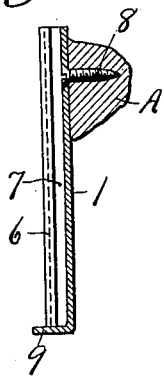
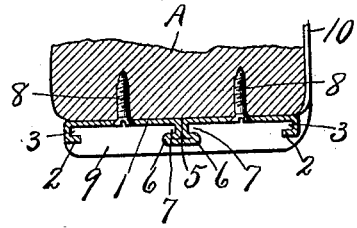
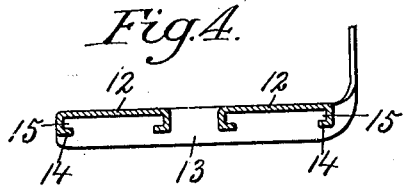
Witnesses.
A. C. Thomas
H. E. Chase
Inventor.
J. J. Walsh.
By
Howard Denison
Attorney.

UNITED STATES PATENT OFFICE.

JOHN J. WALSH, OF SYRACUSE, NEW YORK.

TICKET-HOLDER.

No. 909,972.  Specification of Letters Patent.  Patented Jan. 19, 1909.

Application filed July 14, 1908. Serial No. 443,465.

*To all whom it may concern:*

Be it known that I, JOHN J. WALSH, of Syracuse, in the county of Onondaga, in the State of New York, have invented new and useful Improvements in Ticket-Holders, of which the following, taken in connection with the accompanying drawings, is a full, clear, and exact description.

This invention relates to certain improvements in ticket holders for receiving and retaining what is commonly known as checks which are given out by railway conductors to the passengers when taking up tickets as a voucher for the receipt of such ticket. These checks are usually inserted within the band of the hat of the passenger surrendering the ticket or in some other available place upon the car seat with the result that the check frequently becomes lost or misplaced causing more or less embarrassment and inconvenience to both the passenger and conductor.

My object is to attach to the end of the car seat a simple, practical check holder capable of receiving and retaining the checks of two passengers in the same seat and arranged so that the checks are always visible to the conductor in passing through the aisle of the car.

Another object is to provide the ticket holder with an extension band or strap extending across and secured to the back of the seat and having printed thereon any information which it may be desired to convey to the passenger.

Other objects and uses will be brought out in the following description.

In the drawings—Figure 1 is a perspective view of a portion of the back of a car seat showing my improved ticket holder and placard as applied thereto. Figs. 2 and 3 are vertical and horizontal sectional views taken respectively on lines 2—2 and 3—3, Fig. 1. Fig. 4 is a transverse sectional view similar to Fig. 3 of a modified form of ticket holder in which the back of the upright plate is divided vertically and its meeting edges turned in opposite directions to form the inner retaining flanges for the check.

As shown in Figs. 1 to 3 inclusive, this ticket holder comprises a sheet metal plate —1— secured in a vertical position to one end face of the back —A— of a car seat and has its opposite vertical edges folded inwardly forming opposite upright flanges —2— extending toward each other and spaced a slight distance apart from the back of the plate forming lengthwise grooves —3— to receive the outer edges of a check or ticket —4—.

This check holder is especially adapted for the reception and retention of two checks —4—, one for each passenger of the seat and I, therefore, provide the plate —1— with a central lengthwise rib —5— having opposed flanges —6— extending a slight distance laterally in opposite directions toward the flanges —2— forming lengthwise grooves —7— for receiving and retaining the inner edges of the tickets —4—.

The plate —1— may be secured to the end of the seat by any suitable fastening means as screws —8— and in the present instance, I provide the ticket holder with a bottom abutment —9— against which the lower end of the tickets rest, said abutment being provided with an elongated arm —10— which extends around and across the back of the seat —A— and is secured thereto by suitable fastening means as screws —11—, said arm or band —10— constituting a placard upon which may be printed any information which it may be desired to convey to the passengers.

The vertical height of the ticket holder above the abutment —9— is somewhat less than the length of the tickets to be inserted therein so that when the tickets are resting upon the abutment —9— their upper ends will protrude through and some distance above the grooves in which they are inserted thereby permitting the conductor or other attendant to readily grasp the same in the fingers for insertion into or withdrawal from the holder.

In some instances the ticket holder may be formed as shown in Fig. 4 in which a pair of ticket holders —12— are secured side by side to and rising from a suitable abutment or bottom piece —13—, each ticket holder —12— having its opposite upright edges formed with inturned flanges —14— and intervening grooves —15— for the reception and retention of the tickets, the abutments —13— being similar to the abutment —9—. In each instance, however, the edges of the upright flanges of each ticket holder are spaced some distance apart leaving a clear opening from top to bottom so that the check or ticket may be visible throughout its length.

What I claim is:

1. In combination with a car seat, a metal band applied to the back of the seat and terminating in a check holder resting against the end of said back.

2. In combination with a car seat, a metal plate secured to one end of the seat and provided with opposite upright inturned flanges spaced some distance apart, and an intermediate partition midway between and parallel with the flanges, and an abutment at the bottom of the plate extending across and secured to the back of the seat.

In witness whereof I have hereunto set my hand this 11th day of July 1908.

JOHN J. WALSH.

Witnesses:
H. E. CHASE,
CAROLINE McCORMACK.